United States Patent [19]
Collins

[11] 3,976,932
[45] Aug. 24, 1976

[54] BRIDGE TRANSISTOR INVERTER CIRCUIT

[75] Inventor: James R. Collins, Fort Wayne, Ind.

[73] Assignee: General Electric Company, Carmel, Ind.

[22] Filed: Apr. 15, 1975

[21] Appl. No.: 568,237

[52] U.S. Cl............................. 321/45 R; 307/254; 321/47
[51] Int. Cl.²...................................... H02M 7/53
[58] Field of Search............... 321/11, 12, 13, 27 R, 321/45 R, 47; 307/254, 311, 269; 315/194, 224, 311; 323/21

[56] References Cited
UNITED STATES PATENTS

| | | |
|---|---|---|
| 3,308,372 | 3/1967 | Young et al. ...................... 321/45 R |
| 3,525,883 | 8/1970 | Lordanidis........................... 307/254 |
| 3,766,409 | 10/1973 | Shuey................................. 307/311 |
| 3,828,206 | 8/1974 | Zuk.................................... 307/254 |
| 3,851,240 | 11/1974 | Park et al............................ 321/45 R |

*Primary Examiner*—Gerald Goldberg

[57] ABSTRACT

A bridge type switching transistor inverter circuit for driving high power AC loads such as arc discharge lamps from a DC electrical energy source. Four switching transistors are arranged in bridge configuration that the load may be connected alternately in the inverter circuit between diagonal pairs of switching transistors. Each switching transistor is included in a switching amplifier whose response time is short as compared with the response characteristic of the load and the AC cycle period. A single driver circuit is coupled to the respective switching amplifiers by photocouple isolation means through an electro-optically coupled light emitter-sensor pair. A clock pulse generator provides the necessary signal to the driver circuit which includes a phase splitter driver. A two-stage amplifier receives the signal from the sensor transistor of the photocouple and amplifies it to drive the switching transistor which is, in the preferred embodiment, a power darlington device of the monolithic type.

12 Claims, 10 Drawing Figures

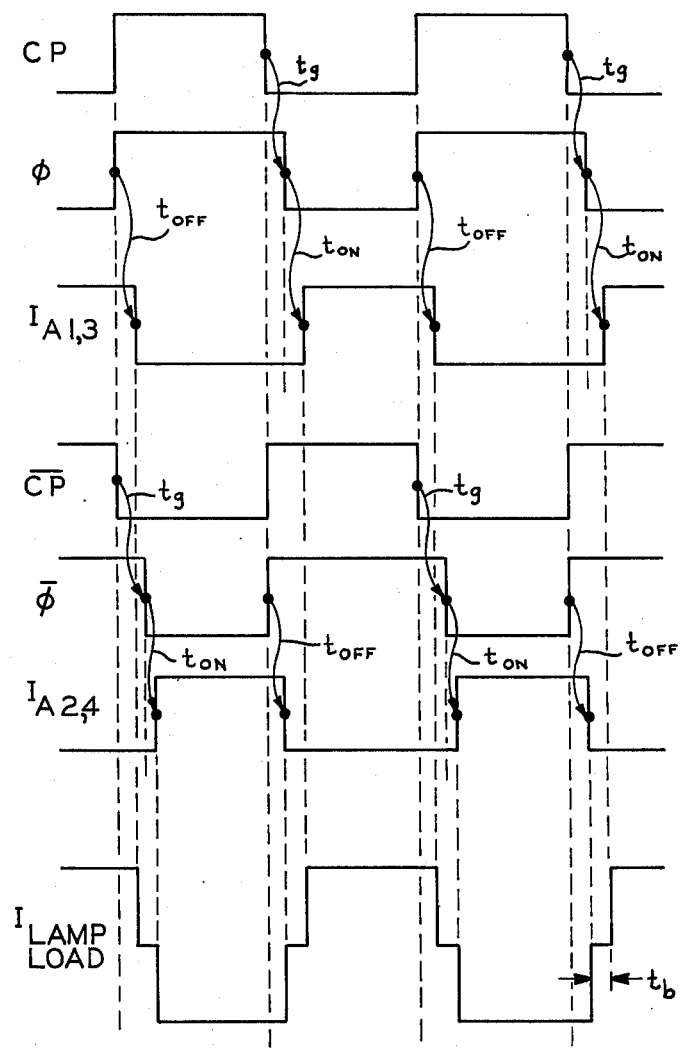
FIG. 6
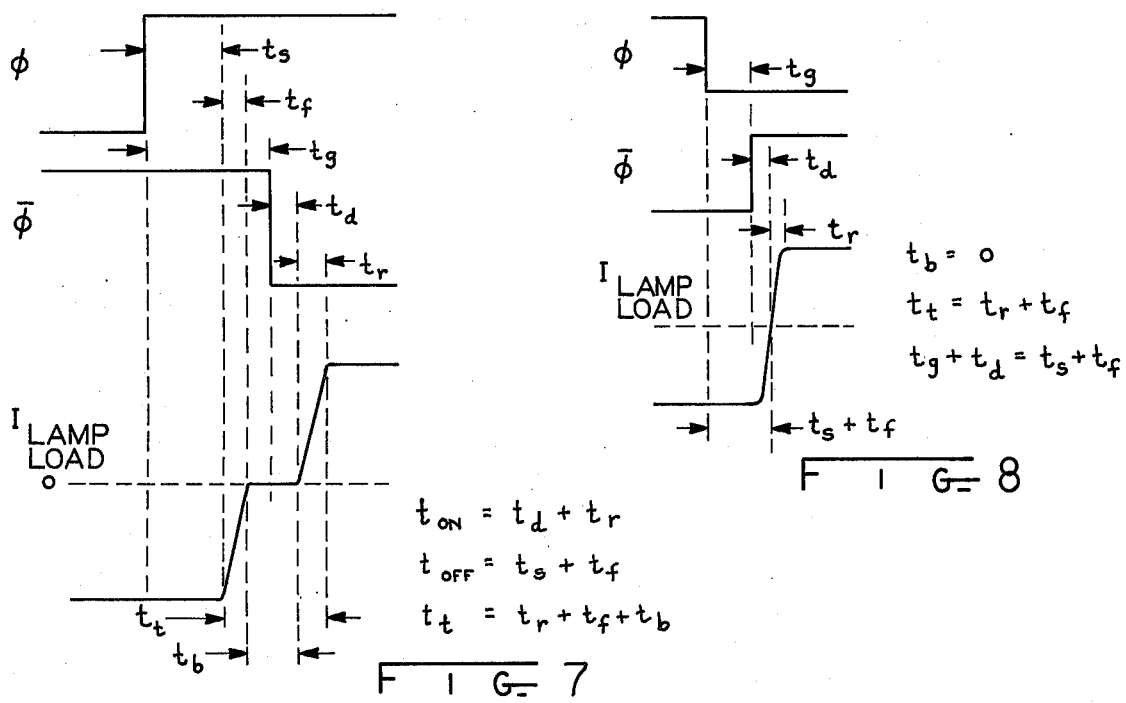
$t_{ON} = t_d + t_r$
$t_{OFF} = t_s + t_f$
$t_t = t_r + t_f + t_b$
FIG. 7
$t_b = 0$
$t_t = t_r + t_f$
$t_g + t_d = t_s + t_f$
FIG. 8

BRIDGE TRANSISTOR INVERTER CIRCUIT

BACKGROUND OF THE INVENTION

1. Field of the Invention:

The present invention relates to an improved bridge type switching transistor inverter circuit for driving high power AC loads from a DC source and more particularly, to such a switching transistor inverter circuit including a switching amplifier circuit for operating a linear metal halide type of arc discharge lamp.

2. Description of the Prior Art:

The bridge inverter has several advantageous features which make it a desirable circuit for operating arc discharge lamps. The first of these features is the peak working voltage requirement on each leg of the bridge. In the bridge inverter, the peak leg stress is equal to the DC source voltage level. This can be contrasted with push-pull inverters and series parallel types which impose a 2X or more multiple of the DC source as the peak working stress on the inverting switches. When the DC source approaches the maximum withstanding voltage capability of available transistor devices, the bridge inverter circuit must be considered for use. Another desirable feature is the way in which loads can be driven with non-symmetrical forward and reverse conduction periods to produce an AC+DC conduction. Transformer coupled load inverters do not have this inherent advantage, although they do constitute the mainstream of products in DC to AC power conversion.

In the power transistors in each leg of the bridge inverter are operated as switches, that is, fully saturated when ON at the maximum load current level and biased into cut off when OFF, then large amounts of power can be controlled in the load with relatively little power loss in the inverter. Furthermore, if one were to keep the switching transition time very short compared to the period of switching, very little power would be lost in the transition and high speed reversal of conduction in the load would be the result. This is essential to keep an arc discharge lamp of the linear metal halide type in the ON state since the lamp has a very short deionization time.

In the use of a switching transistor bridge inverter circuit, there arises the problem of synchronization of the switching of all four legs thereof. Each diagonal crosspair as for example Q1 and Q3 must work as one switch, switching on and off together. For reliable operation especially at high voltage and current levels, it is important that switchover of conduction from one crosspair to the opposite cross-pair occur rapidly. Furthermore, it is imperative that during switchover a vertical leg pair not be biased on with momentary full conduction in the vertical pair as Q1 and Q2. This is a condition described in the art by many terms such as overlap, switchthrough or shoot-through. The consequence is rapid degradation of the transistor pair, if not immediate catastrophic failure. Circuit designers must avoid this condition by designing and/or adjusting in a determinate amount of load current flank time, dead time or zero time. Another approach is to use circuitry to sense the state of the power switches during the switchover interval and with combinatorial logic modifying the base drive signals to the power transistor legs so that simultaneous vertical pair conduction can not occur.

It is desirable when operating a load such as a linear metal halide arc discharge lamp from a bridge inverter circuit to provide simple, electrically isolated, DC coupling of drive logic signals to each of the power legs of the bridge to permit AC with DC component conduction in the load and wherein load conduction of one polarity may be for an indefinite period of time. It is also desirable to provide a safe minimum of load current zero time which factors in variations due to circuit manufacturing tolerances and component variations due to temperature, voltage, current and aging. It is also desirable to eliminate all adjustment means such as potentiometers and the like that have been used to compensate for switching time tolerances among the legs of the inverter bridge.

It is an object of the present invention to accomplish all the above with a minimum of parts and in an efficient and reliable fashion.

SUMMARY OF THE INVENTION

In accordance with one aspect of the present invention, there is provided a bridge type switching transistor inverter circuit for driving high power AC loads from a DC electrical energy source. The inverter circuit includes first, second, third and fourth switching transistors arranged in bridge configuration such that the load may be connected between the junctions of the first and second transistors and the third and fourth transistors. First, second, third and fourth photocouple isolated switching amplifiers include respectively the first, second, third and fourth switching transistors. The respective switching amplifiers have a response time short as compared with the response characteristic of the load and the AC cycle period. A driver is coupled to the respective switching amplifiers by photocouple isolation means for providing necessary out of phase logic and turn on delays to control conduction of the switching transistors and to avoid switchthrough by turning only one diagonal pair thereof at any given time. In the preferred embodiment, the driver includes a clock pulse generator which feeds a phase splitter driver. In another aspect of the invention, there is provided a switching amplifier circuit for the electrically isolated coupling of an input logic circuit with a load. Included is an electrooptically coupled light emitter sensor pair for connection to the input logic circuit. Amplifier means is connected in circuit with the emitter sensor pair for amplifying current received therefrom. An output power transistor is connected in circuit with the amplifier means for controlling output power to the load. A bulk dual DC power supply is connected to the amplifier means for providing operating voltage thereto.

BRIEF DESCRIPTION OF THE DRAWINGS

In the accompanying drawing:

FIG. 6 is a composite timing diagram for the entire clock pulse generator, phase splitter driver circuit and bridge inverter circuit;

FIG. 7 is a more detailed diagram of the timing of the bridge inverter at an instant of transition.

FIG. 8 is another diagram of the timing of the bridge inverter; and

DESCRIPTION OF THE PREFERRED EMBODIMENT

Figure 1:
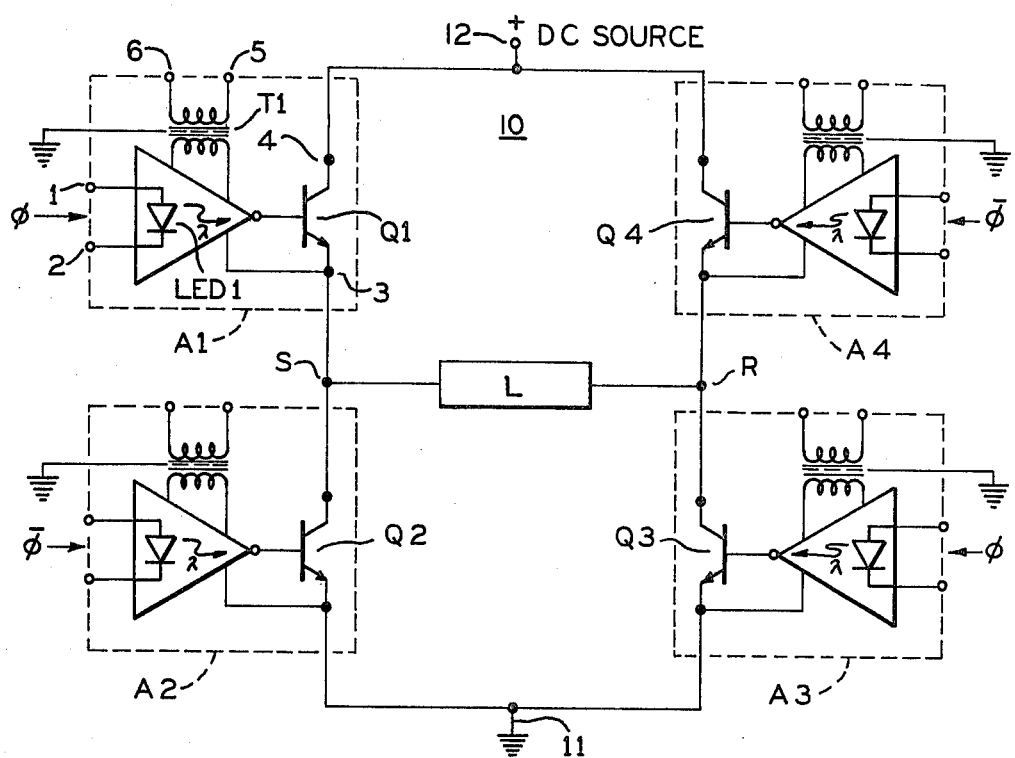
FIG. 1 is a schematic representation of the switching transistor bridge inverter of the present invention.
Figure 4:
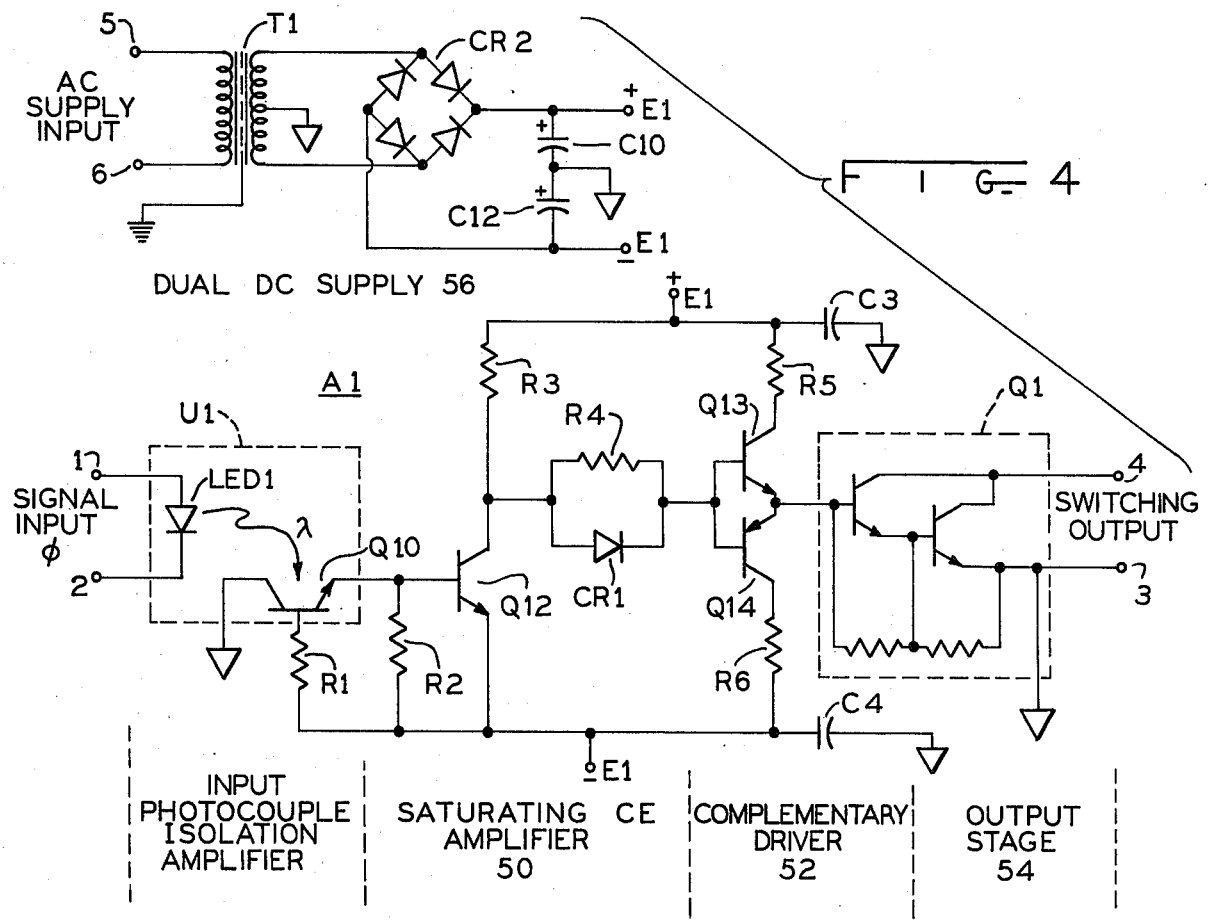
FIG. 4 is a detailed schematic representation of switching amplifier A1 of FIG. 1.

In accordance with the present invention, in one aspect thereof, and referring now to FIG. 1 there is shown a bridge type switching transistor inverter circuit 10 for driving high power AC loads from a DC electrical energy source. Included are first, second, third and fourth switching transistors, Q1, Q2, Q3 and Q4 respectively, there being a load L connected between the junction of Q1 and Q2 and the junction of Q3 and Q4. The lower side of the inverter circuit is grounded as shown at 11, there being provided a terminal 12 at the upper side for connection to a source of DC electrical energy. First, second, third and fourth photocouple isolated switching amplifiers, A1, A2, A3 and A4 include, as shown in FIGS. 1 & 4, the switching transistors Q1, Q2, Q3 and Q4. By switching a diagonal transistor pair Q1 and Q3 with a drive signal $\phi$ received at the signal input terminals 1 and 2, while the opposite diagonal transistor pair Q2 and Q4 is held off by a drive signal complement $\bar{\phi}$, the load L is connected to the DC source with load terminal S at the DC input and load terminal R at the DC return. Load polarity may be reversed by turning the $\bar{\phi}$ transistors on and the $\phi$ transistors off. Alternation of logic levels HI and LO in the drive signals $\bar{\phi}$ and $\phi$ the means for inverting the DC source to produce AC in the load.

Figure 2:
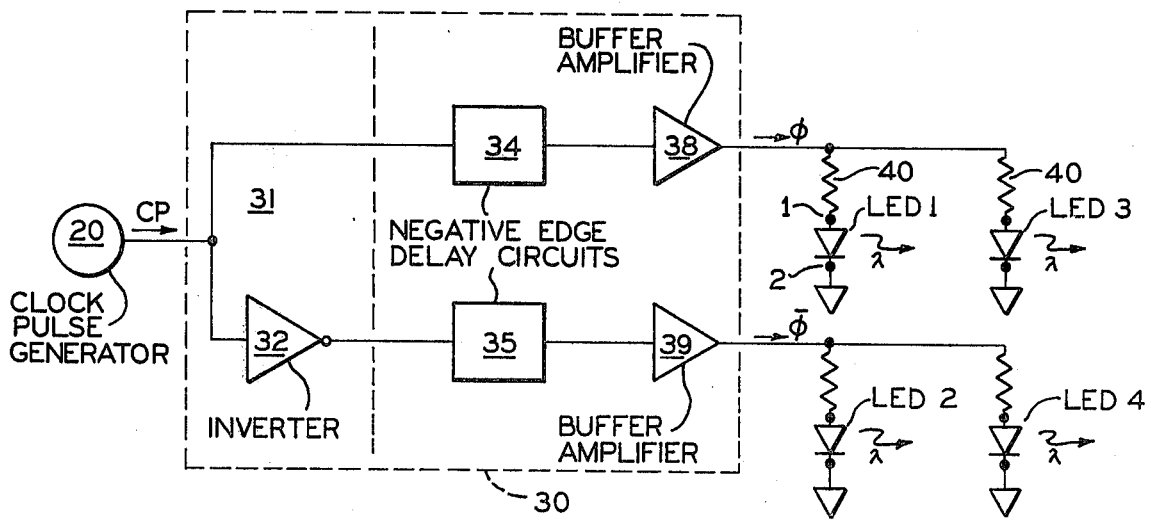
FIG. 2 is a block diagram of the driver circuit for the transistor inverter circuit of the present invention.

As shown in FIG. 2, the drive signals $\phi$ and $\bar{\phi}$ are derived from a driver 30 coupled to the respective switching amplifiers. A clock pulse generator 20 producting a signal CP feeds driver 30 within which is developed the necessary complementary drive logic.

Figure 5:
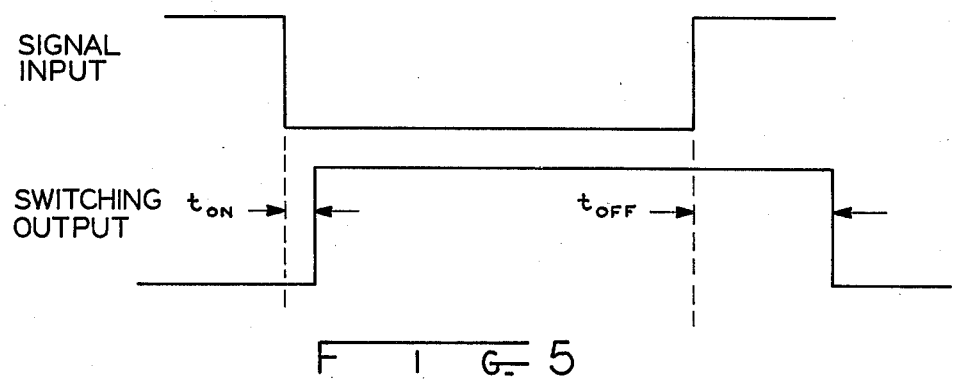
FIG. 5 is a graphic representation of signal input versus switching output of one of the switching amplifiers A1.

In FIG. 2 there is shown by block diagram the clock pulse generator 20 and the driver circuit 30 used for controlling the conduction of the four identical switching amplifiers A1, A2, A3 and A4 shown in FIG. 1. In this circuit are developed the necessary complementary drive signals and the delayed turn on signals which permit the ON transistors in the bridge to turn off before the OFF transistors turn on. A clock pulse input CP emanating from clock pulse generator 20 is fed directly to phase splitter driver 31. The output of the phase splitter is two signal lines, one being a direct connection of the clock pulse and the other an inversion of the clock pulse passing through an inverter 32. Each phase splitter signal is fed to a negative edge delay circuit referred to as 34 and 35. The delay circuits are identical and act to delay the HI to LO transition passing through by a determinate amount. A negative edge delay circuit is used here the switching amplifiers in the bridge are inverting types whose turn-off times are longer than the turn-on times as seen in FIG. 5. The output of each negative edge delay circuit is fed to a buffer amplifier (38, 39) thence to an output load consisting of a ballast resistor 40 and a light emitting diode input (LED1 of the switching amplifier A1 as shown in FIG. 1). A parallel combination of loads is shown but it can be seen that one resistor and both LED inputs for a diagonal switching amplifier pair can be run in one series circuit to get the same result.

Figure 3A:
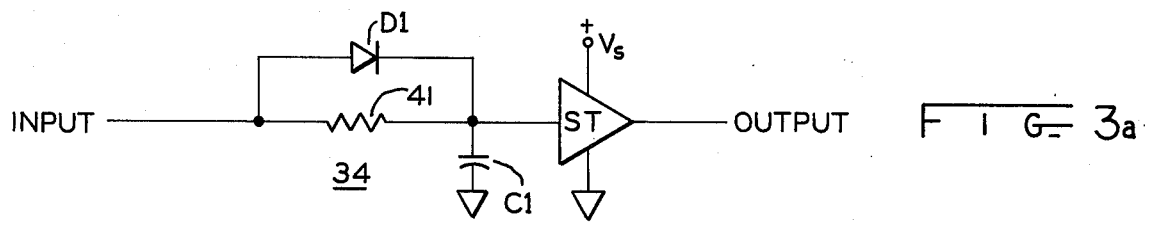
FIG. 3a is a simplified schematic representation of the negative edge delay circuits of FIG. 2 and FIG. 3b and the corresponding timing diagram as used in this embodiment.
Figure 3B:
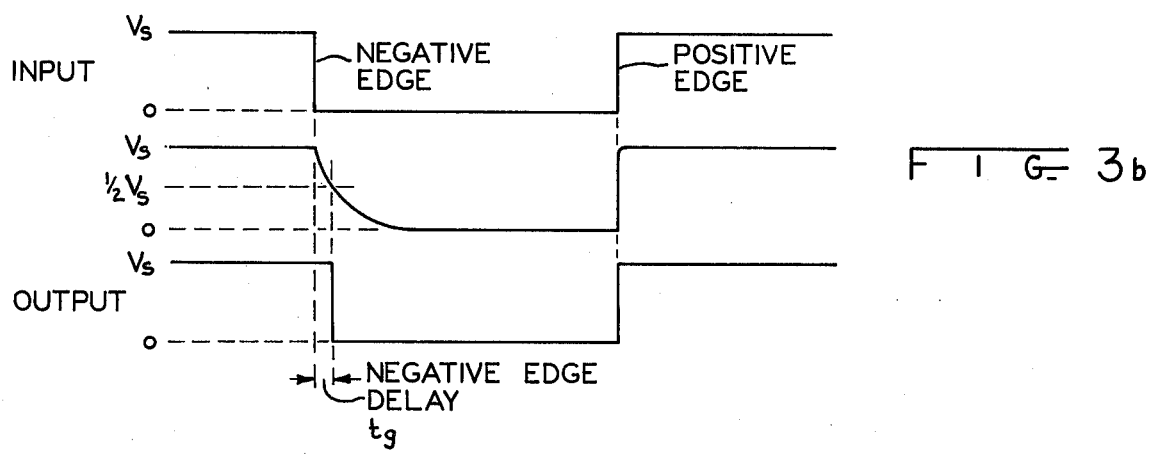
Figure 9:
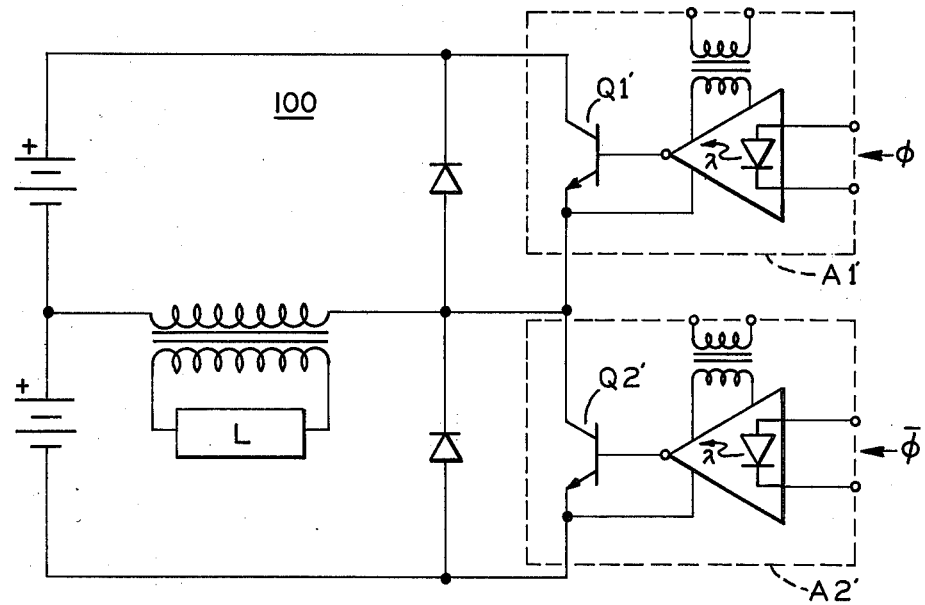
FIG. 9 is a schematic representation of an embodiment of the present invention included in a split power supply switching inverter.

Referring now to FIG. 3, there is shown a simplified schematic diagram of the negative edge delay circuits 34 and 35 and the timing diagram used in this embodiment. The circuit consists of a simple RC-diode combination and a Schmitt trigger ST which act to produce a delayed negative edge output translation but which is transparent to input positive edge transitions. The delay in this circuit is fixed by the time constant of discharge of capacitor C1 through resistor 41 when the input is taken to a logic LO by a low impedance source. In the diagram, the Schmitt trigger ST changes output state at a level equal to one-half the supply voltage. There is a negligible delay between input and output on the input LO to HI transition because capacitor C1 discharged rapidly through diode D1 from a low impedance source feeding the input. The action of this delay circuit could be provided by many types of logic circuits including one-shot and counters. The amount of delay required is dependent upon the variation in switching characteristics for the switching amplifiers A1, A2, A3 and A4 including the effects of temperature and aging. In the preferred embodiment, the delay time $t_a$ was set at 25 microseconds.

In another aspect of the present invention, there is shown in FIG. 4 a switching amplifier circuit A1 for the electrically isolated coupling of an input logic circuit with a load. The circuit of FIG. 4 is an expanded schematic representation of that shown in FIG. 1 and for all practical purposes may be used for A1, A2, A3 and A4. Included is an electro-optically coupled light emitter sensor pair U1 for connection to the input logic circuit. A pair of terminals 1 and 2 receive the signal input from such a logic circuit as for example, shown in FIG. 2. A light emitting diode LED1, when activated, gives off light which is received by an NPN photosensitive transistor Q10. Amplifier means includes a saturating common-emitter (CE) amplifier 50 feeding a complementary driver 52 and serve to amplify current received from the emitter sensor pair U1. An output stage 54 includes output power switching transistor Q1 and which, in the preferred embodiment, is of the monolithic power darlington type. Terminals 3 and 4 are the switching output terminals, and as seen in FIG. 1, 3 is connected to the load and to transistor Q2, and terminal 4 is connected to the DC source. There is also included a bulk dual DC power supply 56 connected to the amplifier means for providing operating voltage. A pair of input terminals 5 and 6 receive AC from a standard AC source and are connected to the primary winding of isolation step-down transformer T1. The secondary winding of output transformer T1 is coupled to a full-wave bridge rectifier CR2, the output of which is coupled across a pair of electrolytic filter capacitors C10 and C12 to produce plus and minus voltages at output terminals E1+ and E1−. These voltages are then coupled to the saturating CE amplifier 50 at corresponding terminals.

The power transistor switching amplifier of the present invention is useful for very high current and voltage output switching and low level logic ($T^2 L$ and the like) compatible at the input. Loads up to 10 amps and 600 volts can be controlled by an input of 20 milliamps to the LED input to the amplifier. With such a combination, the switching times of the amplifier seem to be mainly limited by those of the high-current output transistor. This amplifying circuit was developed principally for use with power switching circuits for operating linear metal halide arc discharge lamps. In such an application there was a need to create a transistor switching amplifier where direct coupling to the EB junction of the output stage was undesirable. Nevertheless there was a need for split second control of forward and reverse base drive to produce an accurate response to timing pulses from a low level logic control circuit. This circuit is very useful in a wide range of power switching applications where there is a need to connect low level logic control circuits while retaining full electrical isolation from the power circuitry.

As stated, the preferred embodiment of this aspect of the invention is shown in FIG. 2. It should be noted that there is no adjustment means included in this embodiment to minimize or adjust the switching time. The prior art has included a trim adjustment in each switching amplifier to make the turn-on and turn-off time approximately equal. The intent here is only to make the switching times small. The external logic circuitry which can be controlled very precisely is where all the compensation is done if required rather than attempting to make adjustment on the high voltage circuits.

The nominal output voltages of the dual DC supply 56 are plus or minus 6 volts, a good level for low cost amplifying transistors. LED 1 in the photocouple input stage is a conventional gallium arsenide light emitting diode. The purpose of this stage is to provide electrical isolation with a minimum of stray coupling capacitance and fast response. Although the output stage 54 in the preferred embodiment is a monolithic power darlington transistor, it need not be restricted to this. This device is selected primarily for its voltage and current handling capability and not for speed as have the transistors in the drive section. The middle stages 50 and 52 provide the current gain.

The switching amplifier A1 of FIG. 4 is an inverting type wherein current input to photocouple U1 is required to bias output switching transistor Q1 into the OFF state. When the input current to terminals 1 and 2 is zero, the photocouple is not operative thus turning transistor Q12 in the CE amplifier stage 50 to the OFF state. Current in resistor R3 is forced through diode CR1 and into the base of Q13 to bias Q13 ON. The voltage at the base of Q13 is approximately 0.7 volts above the circuit common causing Q14 to be biased OFF. With Q13 ON, the collect or current limited by resistor R5 is directed into the base of output transistor Q1 turning it on. To reverse the amplifier from the ON state, we need simply change the photocouple input to a logic HI. LED 1 in the photocouple emits light causing the phototransistor Q10 to conduct further causing Q12 to saturate On. Current through resistors R3 and R4 now flows into the collector of Q12. Q14 is now biased ON while Q13 is biased OFF. A short burst of current is conducted in the collector of Q14 while the minority carriers stored in the base region of output transistor Q1, due to an excess of saturation, are cleared away. After the storage time recovery interval is over, the emitter-base junction of Q1 is held reverse biased which augments the voltage breakdown properties of the triple diffused type NPN transistor.

One aspect of this circuit for which a problem was solved is that part referred to as the photocouple isolation amplifier. It was found that one could not simply use a typical OEM photocouple and expect acceptable switching response. First it was found that the switch-off time of the phototransistor was typically very high, in the 25 - 100 microsecond range for even low collector load impedances. This was clearly unacceptable. This was found to be caused by the Miller capacitance effect of the high impedance base connection. The solution for this problem was to connect the phototransistor with the emitter-base junction of the following load transistor as the only load. This connection works because the current transfer ratio of the photocouple is low and bounded (20 to 100 per cent) so as to keep the phototransistor dissipation well within its capabilities. With this connection, the collector voltage of the phototransistor sees a very low impedance and the collector base potential hardly varies even though current is varying in the junction. Storage time is virtually eliminated. Rise and fall time of the LED have been measured to be smaller than 40 nanoseconds. Actual photocouple rise and fall time approximates 1300 nanoseconds. A second problem interferring with precision photocouple switching was discovered after the high speed collector configuration was developed. A beating variation was noticed in the delay time between the input LED pulse edge and the output phototransistor collector current pulse edge. This was traced to electrostatic field pickup of near fields by the base of the phototransistor. The effect was a slow undulation in the switching time delay for less than 1 microsecond to more than 5 microseconds. The beat effect occurred because the breadboard circuit was operated at 100 Hz and the stray fields operated at 60 Hz. Putting a one megohm resistor on the base helped reduce this effect by only a slight amount and therefore a 100 ohm R1 in FIG. 4 was found to be adequate. Precision switching time control without resistor R1 is impossible. It was also found that the size of the resistors R3 and R4 could be reduced with the addition of diode CR1. The diode permits the forward drive current of the saturating CE amplifier stage 50 to be boosted without increasing power losses in the amplifier.

FIG. 5 shows the signal input at terminals 1 and 2 of the amplifier A1 of FIG. 4 as compared with the switching output appearing on the terminals 3 and 4 thereof.

In FIG. 6 there is shown a composite timing diagram for the entire clock pulse generator, phase splitter drive circuit, and the bridge inverter circuit. Shown are the key transition delays as tg (the negative edge delay selected by a deliberate act), $t_{ON}$ (the inevitable OFF to ON delay between switching amplifier input and output $2_A$) and $t_{OFF}$ (the much larger ON to OFF amplifier propagation delay). The bottom waveform is the resultant lamp load current waveform. The zero current periods in this waveform are the result of $t_g$ larger than that required for the $t_{ON}$ and $t_{OFF}$ period difference for the particular amplifiers in this diagram.

FIG. 7 shows a more involved diagram of the timing of the bridge inverter at an instant of transition. It is less idealized than FIG. 6 in that the ON and OFF output switching current transitions are divided into delay, storage, rise and fall times. The diagram is used to develop the equations for safe switching without switch-through. The following are the design equations:

$$t_a = t_s - t_d + t_f \qquad (1)$$

$$t_b = t_g - (t_s + t_r) + t_d$$

$$= (t_u + t_d) - (t_s + t_r) \quad (2)$$

$$t_t = t_r + t_f + t_b \quad (3)$$

These equations are used: (1) to determine the minimum required $t_g$ to be supplied by the negative edge delay circuit; (2) to calculate the largest $t_b$ to be expected; and (3) to ascertain the smallest $t_t$ possible when the full range of switching response variations are considered.

A typical set of switching parameters for all the photocouple isolated input switching transistor amplifiers is as follows (all times in microseconds):

|  | $t_s$ | $t_f$ | $t_d$ | $t_r$ |
|---|---|---|---|---|
| Maximum | 20 | 5 | 10 | 5 |
| Typical | 10 | 3 | 5 | 3 |
| Minimum | 8 | 2 | 4 | 2 |

Required $t_g$ for worst case set of parameters;

$$t_g = 20 - 4 + 5 = 21$$

Highest $t_b$ for $t_g = 21$ and worst case parameters:

$$t_b = (21 + 10) - (8 + 2) = 21$$

Highest $t_t$ for $t_g = 21$ and worst case parameters:

$$t_t = 5 + 5 + 21 = 31$$

Lowest $t_b$ for $t_g = 21$ and worst case parameters:

$$t_b = (21 + 4) - (20 + 5) = 0$$

Lowest possible $t_t$:

$$t_t = 2 + 2 = 4$$

Thus it is shown that the difficult alignment procedure required in prior art bridge circuits is completely eliminated. No adjustment means is required either in the switching amplifier or on the driving circuit to compensate for switching time differences if these are controlled as shown.

FIG. 8 is an alternate embodiment showing a split power supply switching inverter 100 using the basic principles of the present invention to avoid shoot-through, An inverter circuit as shown in FIG. 1 and FIG. 4 having the following components has operated satisfactorily.

| R1 | 100K | Ohm | 5% | ½W carbon comp. |
|---|---|---|---|---|
| R2 | 4.7K | Ohm | 5% | ½W carbon comp. |
| R3 | 150 | Ohm | 5% | 2W carbon comp. |
| R4 | 470 | Ohm | 5% | ½W carbon comp. |
| R5 | (2)-10 | Ohm | 5% | 2W carbon comp. in parallel |
| R6 | 10 | Ohm | 5% | 2W carbon comp. |
| Q12 |  | 2N2270 |  |  |
| Q13 |  | D40D1 |  |  |
| Q14 |  | D41D1 |  |  |
| Q1 |  | DTS-0730 |  | 15A,600V |
| CR1 |  | 1N4148 |  |  |
| CR2 |  | (4) 1N4004 |  |  |
| C10, C12 |  | 4500 MFD |  | 25V DC Aluminum electrolytic |
| C3, C4 |  | .1 MFD |  | 100V DC Ceramic |

It should be noted that the circuit herein described is not limited to exclusive use as a lamp driver, but could be readily adapted for use as a motor controller or for proportional actuator loads. The circuit is useful when direct line operation at 240V AC is desired at loads up to 6KW. This is an unusually high level for a bridge inverter using power transistors.

It should be apparent to those skilled in the art that the embodiment described heretofore is considered to be the presently preferred form of the invention. In accordance with the Patent Statutes, changes may be made in the disclosed apparatus and the manner in which it is used without actually departing from the true spirit and scope of this invention.

What I claim is new and desire to be secure by Letters Patent in the United States is:

1. A bridge type switching transistor inverter circuit for driving high power AC loads from a DC electrical energy source, comprising:

first, second, third and fourth photocouple isolated switching amplifiers, including first, second, third and fourth load switching transistors respectively for controlling power to the load and arranged in the bridge configuration that the load may be connected between the junctions of the first and second transistors and the third and fourth transistors;

a driver circuit connected to the respective switching amplifiers by photocouple isolation means for providing necessary complementary drive logic and turn-on delays coordinated to the switching amplifier response time to control conduction of the photocouple isolated switching amplifiers for avoiding a simultaneous conduction period of the first and second switching transistors and the third and fourth switching transistors at the instant of inverter circuit reversal of load polarity.

2. The inverter circuit of claim 1 wherein the driver circuit comprises: a clock pulse generator and a phase splitter driver.

3. The inverter circuit of claim 2 wherein the phase splitter driver includes edge delay drive logic conditioning circuitry.

4. The inverter circuit of claim 1 wherein the photocouple isolated switching amplifiers, respectively, comprise:

an electro-optically coupled light emitter-sensor pair connected to the driver;

amplifier means connected in circuit with the emitter-sensor pair for amplifying current received therefrom to be fed the switching transistor;

a line operated bulk dual DC power supply connected to the amplifier means for providing forward and reverse base driver thereto.

5. The inverter circuit of claim 1 wherein the switching amplifiers respectively, comprise:

a light-emitting diode-phototransistor isolator amplifier wherein the phototransistor collector circuit in connected in a low impedance circuit to provide current limiting by the intrinsic current transfer ratio of the photocouple isolation pair to enhance switching speed;

a current amplifying and level-shifting means connected between the photocouple isolator pair and the output power transistor for providing forward and reverse base drive thereto; and a line operated bulk DC power supply connected to the current amplifying and level shifting means for providing forward and reverse base drive thereto.

6. The inverter circuit of claim 5 wherein the current amplifying and level-shifting means comprises:
   a saturating common-emitter amplifier connected to the output of the emitter-sensor pair; and
   a complementary drive amplifier connecting the saturating common-emitter amplifier with the switching transistor.

7. The inverter circuit of claim 5 wherein the bulk dual DC power supply is of the type having a line isolating step-down transformer with a center-tapped secondary winding feeding a full-wave rectifier and a capacitor filter.

8. The inverter circuit of claim 5 wherein the circuit of the light emitter diode phototransistor isolation amplifier includes a light emitting diodephototransistor pair whose phototransistor collector-emitter output is solely connected in a low impedance loop to the emitter-base junction of a following amplifier stage and the bulk DC supply.

9. The inverter circuit of claim 8 wherein the circuit of the light emitting diode-phototransistor isolation amplifier further includes a resistor connected to the base of the output phototransistor and the bulk DC supply.

10. The inverter circuit of claim 8 wherein the saturating amplifier includes a common emitter connected transistor whose emitter-base junction is connected to the phototransistor and first resistor connected as the collector load and a second resistor connected between the junction of the first resistor and the collector of the transistor and the input of a following complementary drive amplifier.

11. The inverter circuit of claim 10 further including a diode connected in parallel with the second resistor.

12. The inverter circuit of claim 6 wherein the complementary drive amplifier includes a first transistor connected to a second transistor, the base terminals of each being common and the emitter terminal of each being common and collector load resistors for the respective transistors, the common emitter terminals being connected to the input of the output power transistor.

* * * * *